Patented Nov. 21, 1922.

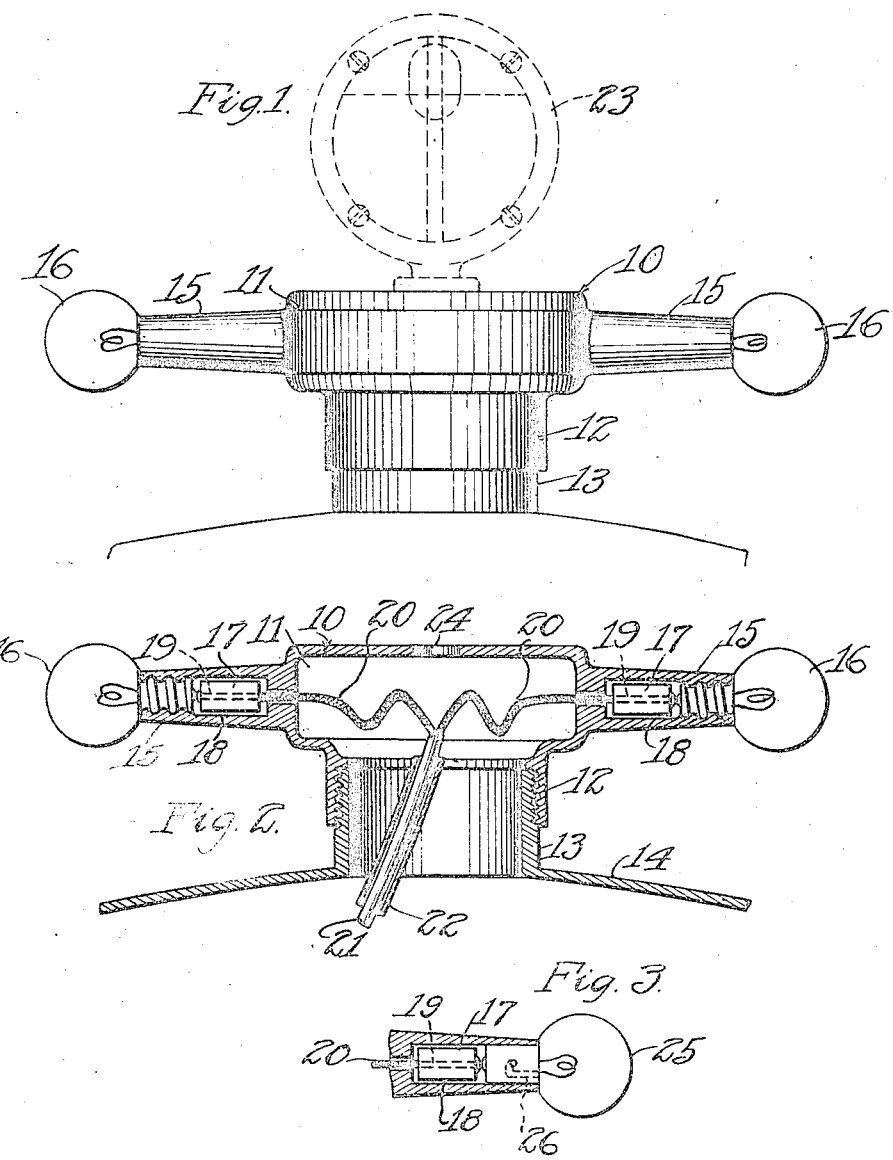

1,436,113

UNITED STATES PATENT OFFICE.

GEORGES ROUDANEZ, OF CHICAGO, ILLINOIS, ASSIGNOR TO LU-MIN-US-CAP COMPANY, OF CHICAGO, ILLINOIS, A CORPORATION OF ILLINOIS.

RADIATOR CAP FOR AUTOMOBILES.

Application filed July 21, 1921. Serial No. 486,332.

*To all whom it may concern:*

Be it known that I, GEORGES ROUDANEZ, a citizen of the United States, residing at Chicago, in the county of Cook and State of Illinois, have invented certain new and useful Improvements in a Radiator Cap for Automobiles, of which the following is a specification.

This invention relates to an improved radiator cap for automobiles and more particularly pertains to a cap that has self-contained means adapting it for additional use as an illuminating device for the automobile on which it is mounted.

The increasing use of moto-meters and other indicating instruments or ornamental attachments mounted on the radiator caps of automobiles renders it highly desirable that some illuminating means be provided which will enable such indicating instruments to be easily read at night.

The primary object of the invention is to provide a radiator cap having self contained means that adapt it for use as an illuminating device, and which finds one of its most important advantages in illuminating the moto-meter which is often mounted on the radiator cap.

In its preferred form the invention contemplates in association with a radiator cap provided with means for mounting a moto-meter or other indicating device or attachment thereon, means for illuminating preferably embodying a plurality of outwardly extending arms integrally formed with the cap, incandescent electric lamps supported by the free ends of said arms and securely fastened thereto and conductors for the lamps extending and through the arms, through the radiator cap, the conductors after passing through the radiator cap continue back to connection with a switch which is mounted on some part of the car easily accessible to the driver.

The lights used in the device are preferably of the small incandescent type which consume a relatively small amount of electricity as compared with the head lights and may be used continuously or intermittently, as the case may be, and when the car is parked, the head lights may be turned off and the radiator cap lights turned on to serve as running side lights or as parking lights, thereby effecting a considerable saving in batteries.

These lights serve to clearly outline the car so that in passing dark crossings or turning dark corners the car is clearly visible to vehicles approaching from either side and danger of collision is thereby minimized.

The radiator cap, by reason of its prominent position on the front of the automobile, is an ornate accessory thereof and possesses utility even where no moto-meter is present, and another object of the invention is to provide a cap for automobile radiators having self contained illuminating means comprising a plurality of vari-colored small incandescent lamps which are adapted to make the said radiator cap a highly useful and ornamental device.

The invention consists in the novel constructions and arrangements to be hereinafter described and claimed for carrying out the above stated objects and such other objects as will appear from the following description of a certain preferred embodiment illustrated in the accompanying drawing, wherein—

Fig. 1 is an elevational view of the device mounted on a radiator showing a moto-meter attached thereto;

Fig. 2 is a sectional view of the device without a moto-meter attached and showing the arrangement of the lights and wiring; and Fig. 3 is a sectional view of a fragmentary portion of an arm of the cap illustrating an alternative mounting for a lamp;

Similar characters designate like parts in all the figures of the drawings.

Referring to the drawings, it will be seen that the device comprises a radiator cap 10 having a cylindrical-shaped body 11 and a downwardly extending threaded member 12 engaging a neck member 13 mounted on a radiator 14.

A plurality of outwardly extending integrally formed arms or branches 15 are mounted on the cylindrical-shaped body 11, each of said arms or branches having an incandescent lamp 16 mounted on its free end and threaded therein to contact with an insulated contact member 17 which is inserted in an opening 18 of the arm 15. The contact members 17 are connected to conductors 19 which are each insulated by steam and water proof covering material 20 and are joined together to form a cable 21 which extends back to a switch mounted on the dash (not shown).

The cap is removable with the lights turned on so that the radiator may be illuminated during the process of filling.

A moto-meter 23 is preferably mounted on the top portion of the cap in an eccentrically positioned opening 24 so that the rays of light from the lamps 15 strike the moto-meter in a way to clearly illuminate the face thereof.

In case it is desirable to leave off the moto-meter 23, the opening 24 can be stopped up by a plug (not shown). In Fig. 3 is shown an alternative embodiment of the device in which a lamp 25 is pushed into contact and held in place by a bayonet mounting 26. While the device of my invention entails the specific embodiments set forth herein in order to attain the objects outlined hereinbefore, it is understood that various minor changes may be made within the scope of the invention.

Thus it will be seen that a radiator cap has been provided for use on automobiles which in addition to its use as a radiator cap serves also as an illuminating device for the moto-meter which may be mounted thereon and also as a parking light and still further constitutes an ornate accessory for an automobile.

I claim:

1. A detachable fixture for automobile radiators comprising a hollow body having a threaded extension for engaging the radiator body, a moto-meter mounted on the hollow body, branch like supporting arms on the hollow body, electric illuminating devices carried by said arms and conductors for said illuminating devices extending through the arms.

2. In a cap for automobile radiators, comprising a hollow body having an axial extension for detachable engagement with the radiator body, a laterally extending hollow arm mounted on said hollow body, an electric lamp supported by the free end of said arm and a conductor for said lamp extending through said hollow body and arm.

3. In a cap for automobile radiators, comprising a hollow body having an axial extension for detachable engagement with the radiator body, a moto-meter mounted on the cap, a plurality of laterally extending hollow arms integrally formed with said hollow body, incandescent electric lamps for illuminating the moto-meter and supported by the free ends of said arms and conductors for said lamps extending through said hollow body and arms.

4. In a cap for automobile radiators, comprising a hollow body having an axial extension for detachable engagement with the radiator body, a plurality of laterally extending hollow arms integrally formed with said hollow body, the outer ends of said arms being provided each with a lamp socket, incandescent lamps directly receivable into said sockets, said arms forming one side of the circuit and insulated conductors forming the other side of the circuit and extending through said arms and hollow body.

5. In a cap for automobile radiators comprising a body having one end adapted for connection to the radiator body and a laterally extending arm having a recess therein, said recess having a wall at one end, contact making elements arranged in the recess, one extremity of the arm having means whereby a lamp may be associated with the arm and brought into contact with the contact making elements, said wall preventing the movement of the contact making elements in one direction relative to the arm.

6. In a cap for automobile radiators adapted to permit the association of a moto-meter therewith, said cap comprising a body having one end adapted for connection to the radiator body and a laterally extending arm having a recess therein, said recess having a wall at one end, contact making elements, arranged in the recess, one extremity of the arm having means whereby a lamp may be associated with the arm and brought into contact with the contact making elements, said wall preventing the movement of the contact making elements in one direction relative to the arm.

GEORGES ROUDANEZ.